Figure 5:
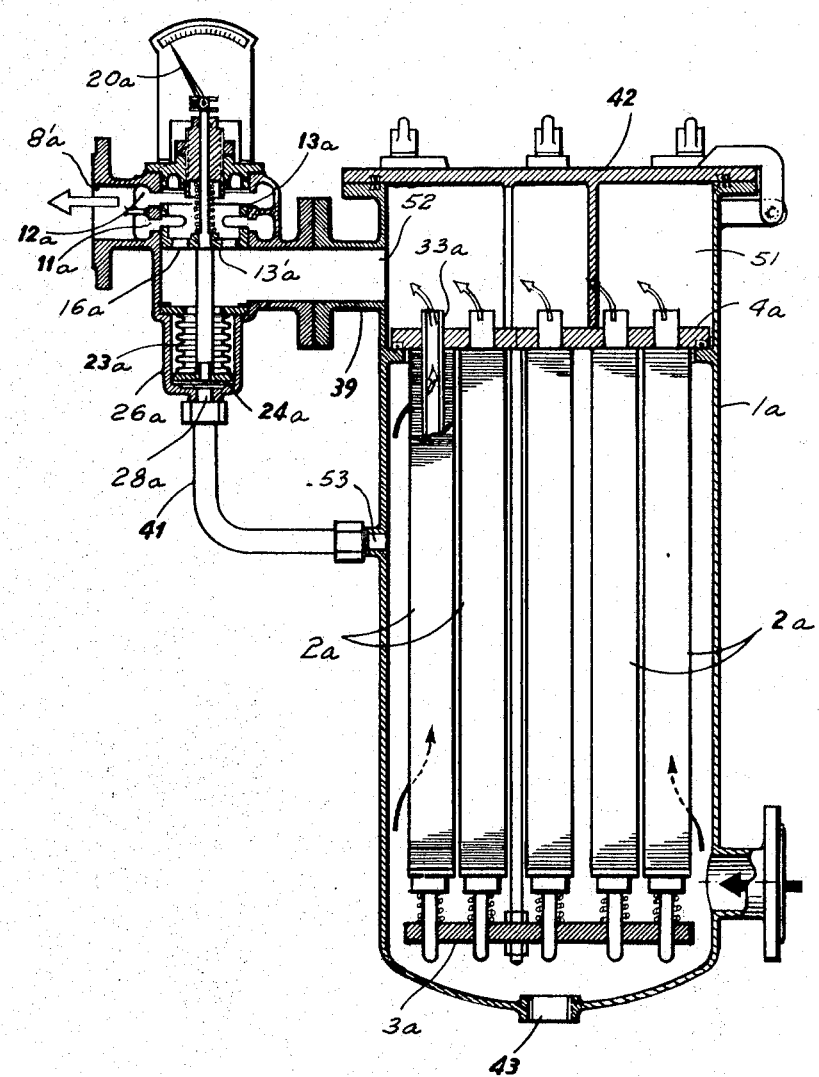

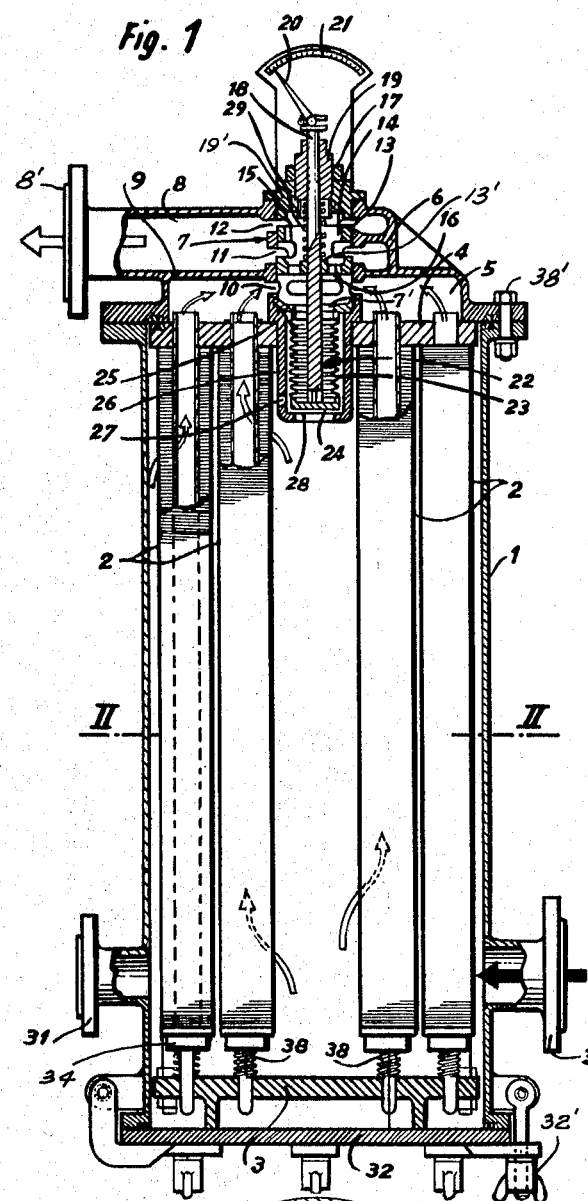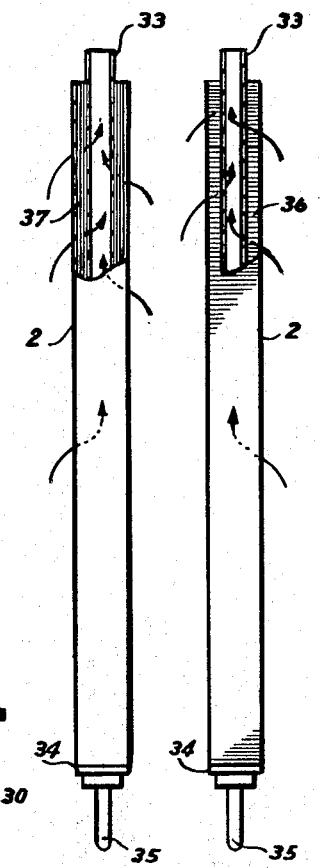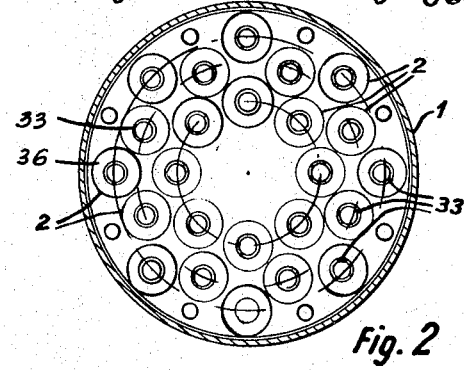

INVENTOR
JACQUES MULLER
BY
Dean, Fairbank & Hirsch
ATTORNEYS

United States Patent Office 3,298,522
Patented Jan. 17, 1967

3,298,522
WATER REMOVAL EQUIPMENT FOR FUELS
Jacques Muller, La Garenne-Colombes, France, assignor to Rellumit, Inter, La Garenne-Colombes, France, a corporation of France
Filed May 27, 1964, Ser. No. 370,635
Claims priority, application France, June 7, 1963, 937,297
5 Claims. (Cl. 210—90)

This invention relates to the art of filtering equipment, more particularly of the type to remove water from fuel.

As conducive to an understanding of the invention, it is noted that when gasoline or other fuels are transferred from a storage tank to an engine for combustion, it has been found that in many cases, despite prior purification of the fuel, traces of water or even fine droplets of water are present in the fuel which may result in malfunctioning of the engine being supplied, which is especially serious in the case of aircraft.

It is among the objects of the invention to provide an equipment that is simple in construction, dependable in operation and which will automatically eliminate water present in fuels and as the amount of water absorbed increases, will slow down the rate of flow in order to insure total absorption and will stop the flow when the absorbent elements of the equipment have become saturated, while continuously indicating the degree of such saturation.

According to the invention, the equipment comprises a container in which is positioned a plurality of absorbent elements through which the untreated fuel is passed, the absorbent elements providing a long path for the fuel for maximum absorptive effect. Means are provided, as the absorbent elements become more and more saturated, progressively to reduce the rate of flow of the fuel therethrough to facilitate further absorption of the water and also to indicate the degree of absorption, such means cutting off flow when the absorbent elements have become saturated.

In the accompanying drawings in which are shown one or more of various possible embodiments of the several features of the invention, FIG. 1 is a longitudinal sectional view of the equipment according to one embodiment of the invention, FIG. 2 is a transverse sectional view taken along line 2—2 of FIG. 1, FIGS. 3 and 4 are plan views partly in section of two different types of absorbent elements, and FIG. 5 is a view similar to FIG. 1 of another embodiment of the invention.

Referring now to the drawings, the equipment comprises a cylindrical container 1, in which is positioned a plurality of stacks 2 of absorbent elements which illustratively are in the form of discs or washers 36 as shown in FIGS. 1, 2 and 3, positioned on a central perforated tube 33.

The stacks 2 are positioned vertically between two parallel support plates 3 and 4, the former being positioned adjacent the floor 32 of the container and the latter at the upper end thereof. As is shown in FIG. 1, the lower end of each tube 33 is closed by a plug 34 which has a depending pin 35 that extends through an associated opening in plate 3, a coil spring 38 being compressed between the plug 34 and plate 3. Thus, the absorbent washers 36 encompassing the tube 33 are retained in compacted relation by the spring 38, but may expand upon absorption thereof, in the manner to be described.

The upper end of each tube 33 extends through an associated opening in plate 4 so that each tube 33 is in communication with a chamber 5 formed in a cover member 6 that has a lateral flange for connection thereof to a corresponding flange at the upper end of the container 1 by bolts 38'.

The cover member 6 also includes a second chamber 8 positioned above chamber 5 with a common partition or wall 9 therebetween, said chamber 8 having an outlet 8' for the filtered dehydrated fluid.

Positioned vertically in chambers 5 and 8 is a cylinder 7 which is rigid with the cover member 6, and the lower end 7' of which abuts against a washer 25 positioned in an annular recess in the upper end of a cup-shaped receptacle 26 which has openings 27, 28 in the lower end of its side wall and in its bottom wall. The receptacle 26 has an annular flange at its upper end and extends through an axial opening in plate 4 with the flange resting on the periphery of said opening.

The cylinder 7 has a plurality of slots 10, 11 and 12 in the wall thereof, the slot 10 defining a port leading into chamber 5, and the slots 11 and 12 defining ports leading into chamber 8.

Slidably mounted in the cylinder 7 is a hollow valve member 13 which has a transverse wall 13' at its lower end with passageways 16 therethrough, an axial rod 17 being secured to said wall 13'. The side wall of the valve member 13 has ports 15 which may be moved into and out of alignment with ports 11 and 12 when the valve member is moved to open and close said ports 11 and 12.

The upper end 18 of rod 17 extends through the open upper end 14 of the valve member and through the bore of a guide member 19 mounted in a plug 19' secured in an opening in the upper wall of the cover member 6.

The free end of the rod 17 is secured to a pivoted indicating needle 20 in conventional manner so that upon up and down movement of rod 17 the needle will move over a graduated scale 21.

The lower end 22 of rod 17 extends through washer 25 and through a bellows 23, a disc 24 being secured to the lower extremity of rod 17 and to the lower end of the bellows.

A coil spring 29 is compressed between the lower end of guide member 19 and the transverse wall 13', normally to urge the valve member 13 to its lowermost position in which ports 11 and 12 are open for flow of the dehydrated fluid therethrough.

The container 1 has a fluid inlet connection 30 at its lower end for untreated fluid and an outlet connection 31 normally closed by a valve (not shown) for return of the untreated fluid to a reservoir, if desired.

The lower end of the container 1 is closed by the pivoted closure plate 32 which defines the floor thereof and which is releasably retained in place by wing nuts 32' and which may readily be opened for cleaning of the equipment and for removal of the stacks 2 to replace the elements 36 thereof.

Although in the embodiment of FIGS. 1 to 3, the absorbent elements are discs or washers 36 of suitable absorbent material, it is within the scope of the invention to utilize sheets or ribbons 37 (FIG. 4) of absorbent material wound around the perforated tubes 33.

In the operation of the equipment the fluid to be treated is forced through port 30 into the container 1 and passes through the absorbent elements 36 of stack 2 and through the perforated tube 33 into chamber 5. It then flows into port 10 of cylinder 7 and into the hollow valve member 13 through the passageways 16 thereof. The fluid then flows through ports 15 of the valve member and through ports 11, 12 of the cylinder into chamber 8 and then is discharged through port 8'.

If there is water present in the fluid, it will be absorbed by the elements 36 or 37 (as the case may be) of the stacks 2 so that the fluid discharged from port 8' will be substantially devoid of water.

As more and more water is absorbed, the elements 36 will gradually swell, thereby retarding the flow of fluid through the filter columns 2, so that the pressure in container 1 will gradually build up.

As a result, the fluid pressure on the disc 24 will gradually build up to overcome the force of spring 29 and bellows 23 causing the valve member 13 to rise, thereby gradually closing the ports 11 and 12 until they are completely cut off. Upward movement of the valve member and the rod 17 will cause the needle 20 to move in a clockwise direction indicating the position of the valve member and hence the water content of elements 36, on the scale 21. Thus, when the needle has moved a predetermined amount which is correlated with a predetermined absorption of water by elements 36, the inlet port 30 can be closed and the water saturated discs 36 replaced. Thereafter, the operation is resumed.

If the equipment operates by suction applied to port 8', to draw the untreated fluid from inlet port 30, as the absorbent elements of stacks 2 become saturated, the pressure drop in chamber 5 will cause the greater pressure reacting through opening 28 to compress the bellows 23 causing the valve member 13 to rise until it closes ports 11 and 12.

In the embodiment shown in FIG. 1, the automatic shutoff device is positioned within the container 1. In the embodiment shown in FIG. 5, it is positioned exteriorly of said container.

Referring to FIG. 5 in which elements corresponding to those of FIGS. 1 to 4 have the same reference numerals with the subscript *a*. The container 1*a* has filter stacks 2*a* identical to those of FIG. 1 and supported in the same manner by plates 3*a* and 4*a*.

A chamber 51 is provided above the plate 4*a* and the upper ends of tubes 33*a* lead into this chamber which is closed by a pivoted cover plate 42.

The chamber 51 has an outlet port 52 which is coupled by pipe 39 to a shutoff device identical to that mounted in the cover member 6 of the embodiment of FIG. 1.

As is clearly shown in FIG. 5, fluid passing through pipe 39 will flow through passageways 16*a* in wall 13'*a* of valve member 13*a* and then will flow through openings 11*a*, 12*a* and through discharge port 8'*a*.

The opening 28*a* of receptacle 26*a* is connected by pipe 41 to a port 53 leading into the container 1*a* so that the disc 24*a* and bellows 23*a* are subjected to the pressure in the container 1*a*.

As the operation of the embodiment of FIG. 5 is identical to that of the embodiment of FIGS. 1 to 4, it will not be described.

With the equipment above described, it is apparent that when the absorbent elements are saturated with water so that the treated fluid can no longer pass through the stacks 2, the valve member 13, 13*a* will rise to close the discharge ports. The degree of saturation of the absorbent elements can readily be determined by reason of the indicating needle 20, 20*a* so that the inlet port can be closed and the absorbent elements replaced before full closure has occurred.

It is of course within the scope of the invention by proper selection of the absorbent elements to have one type of fluid other than water absorbed and another type of fluid pass through the stacks.

As many changes could be made in the above equipments, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Equipment of the character described for removing one fluid from another in small proportions, comprising a container having an inlet and an outlet, a plurality of absorbent elements in said container adapted to absorb the first of said fluids and permit passage of the second fluid, to said container outlet, a discharge chamber having an inlet for said second fluid and an outlet for said second fluid, a cylinder having a port in communication with the inlet to said discharge chamber, valve means slidably mounted in said cylinder and controlling said port, said valve means being hollow, a passageway between the outlet of said container and the interior of said hollow valve means, said valve means having a port movable into and out of alignment with the port of said cylinder to connect said ports, to provide communication between said container and said discharge chamber outlet through said hollow valve means, a bellows operatively connected to said valve means, said bellows being subjected to the pressure in said container and responsive to the increase of differential between the pressure in said container and said discharge chamber caused by the saturation of said absorbent elements to effect movement of said valve member and closure of said ports, and resilient means normally urging said valve means to open position.

2. The equipment recited in claim 1 in which each of said absorbent elements comprises a perforated tube and a stack of absorbent washers encompasses said tube.

3. The equipment recited in claim 1 in which each of said absorbent elements comprises a perforated tube and a sheet of absorbent material is wound around said tube.

4. The equipment recited in claim 1 in which a pivoted indicating needle is provided and a linkage operatively connects said indicating needle to said valve means whereby the position of said needle will be correlated with the degree of saturation of said absorbent elements.

5. The equipment recited in claim 1 in which said container has a chamber at one end in communication with said container outlet and into which the fluid passing through said absorbent elements may flow, a casing is positioned exteriorly of said container, said casing having a cylindrical portion therein defining said cylinder, said valve means comprising a valve member slidably mounted in said cylindrical portion and a line is provided connected between said container and said casing to subject said bellows to the fluid pressure in said container.

References Cited by the Examiner

UNITED STATES PATENTS

| | | | |
|---|---|---|---|
| 2,692,684 | 10/1954 | Hallinan | 210—100 |
| 3,080,058 | 3/1963 | Rosaen | 210—90 |
| 3,117,925 | 1/1964 | Kasten | 210—96 |

REUBEN FRIEDMAN, *Primary Examiner.*

DANIEL M. RIESS, *Examiner.*